(12) United States Patent
Hightower et al.

(10) Patent No.: US 6,510,550 B1
(45) Date of Patent: Jan. 21, 2003

(54) METHOD AND APPARATUS FOR PROVIDING INTERMITTENT CONNECTIVITY SUPPORT IN A COMPUTER APPLICATION

(75) Inventors: Richard Matthew Hightower, Chandler, AZ (US); George Patrick Moakley, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/310,329

(22) Filed: May 12, 1999

(51) Int. Cl.[7] .................................................. G06F 9/44
(52) U.S. Cl. ........................ 717/108; 717/101; 717/104; 717/108; 709/228; 709/314; 709/318
(58) Field of Search .......................... 707/100; 709/200, 709/328, 227–228, 314, 318; 717/1, 2, 100–118

(56) References Cited

U.S. PATENT DOCUMENTS

| | | | |
|---|---|---|---|
| 5,854,750 A | * 12/1998 | Phillips et al. | 364/478 |
| 5,862,327 A | * 1/1999 | Kwang et al. | 395/200 |
| 6,070,184 A | * 5/2000 | Blount et al. | 709/200 |
| 6,094,688 A | * 7/2000 | Mellen-Garnett et al. | 709/328 |
| 6,199,068 B1 | * 3/2001 | Carepenter | 707/100 |

OTHER PUBLICATIONS

Client/Server Programming with JAVA and CORBA, Robert Orfali and Dan Harkey, ©1997.*
Principles Of Object Oriented Analysis and Design,James Martin ©1993.*

"JAVA Remote Method Invocation—Distributed Computing for JAVA," available at http://www.javasoft.com/marketing/collateral/javarmi.html as of Jan. 28, 1999.

"The Java™ Language: An Overview," available at http://java.sun.com/docs/overviews/java/java–overview–1.html as of Jan. 28, 1999.

"JavaBeans™", Version 1.01, Jul. 24, 1997, (available from Sun Microsystems, Inc.).

* cited by examiner

Primary Examiner—Tuan Q. Dam
Assistant Examiner—Chuck Kendall
(74) Attorney, Agent, or Firm—Kenyon & Kenyon (57) ABSTRACT

A method and apparatus for providing an application with intermittent connectivity support is disclosed. In accordance with one embodiment, an application development tool is configured for providing intermittent connectivity support in an application that uses distributed objects. The application development tool includes an intermittent connectivity framework that has program code for queuing method calls, as well as an intermittent connectivity component generator that has program code for converting an existing interface for a distributed object into an intermittent connectivity component configured to forward method calls to the intermittent connectivity framework. Method calls may be queued, for example, when there is no connection to the distributed object, and then later completed after restoration of the connection. According to one particular implementation of this embodiment, the intermittent connectivity component generator is in the form of a wizard utility.

22 Claims, 6 Drawing Sheets

METHOD AND APPARATUS FOR PROVIDING INTERMITTENT CONNECTIVITY SUPPORT IN A COMPUTER APPLICATION

FIELD OF THE INVENTION

The present invention relates generally to the field of computer applications development, and in particular to methods and apparatus for providing applications with the ability to support intermittent connectivity processing.

BACKGROUND OF THE INVENTION

The typical business client platform is, increasingly, a mobile platform (e.g., a laptop or notebook computer) rather than a desktop system. Despite this trend, enterprise applications software (e.g., server-based corporate business systems) are often written with mobile support as little more than an afterthought. The unfortunate result is that business users often can only be fully productive when actually connected to their home office computer system.

Recent advances in connectivity options for mobile platforms have improved the utility of such computers considerably, but users who access enterprise systems through mobile computers still face at least two significant problems. First, many recently developed connectivity solutions are bandwidth-constrained, unreliable, or both. Second, there are many environments in which connectivity of any kind is simply not a viable option (e.g., while on an airplane).

A developer faced with the task of supporting intermittent connectivity to an enterprise application typically has several options, including: (1) adopt an entire communications database/workgroup approach, (2) use a lightweight database application with synchronization capability, (3) develop a custom solution, or (4) use message-oriented middleware (i.e., message queuing). All of these approaches generally require a significant investment in time and require a sufficient level of expertise on the part of the developer. Also, each option may best fit only certain types of applications. Moreover, as an application evolves over time to incorporate new features, it may be necessary to use several of the above-identified options, or it may be necessary to upgrade support in a particular option. In addition, to mention just a few specific drawbacks of these approaches, option (1) requires a significant investment in training and expertise, and tends to use special development tools that closely tie an application to a single product (e.g., communications database/workgroup application, lightweight database application with synchronization capability); option (3) is extremely expensive, inefficient and time consuming, and usually involves very high support costs; and options (2) and (3) generally require either tying an application to a particular vendor's product or using a standard interface that limits the application to using the vendor's product in an LCD (least common denominator) fashion (i.e., sacrificing functionality and features for the sake of conforming to a standard).

Set against the backdrop of these challenges facing developers desiring to make their enterprise applications more "mobile-aware," there has been a marked trend in the field of software development towards more "developer-friendly" programming languages. This trend is perhaps best exemplified by the rapid proliferation of the Java programming language, developed by Sun Microsystems, Inc. The Java programming language has become the language of choice for many application developers because of its relative ease-of-use, support for object-oriented programming techniques, support for networking, and general independence from architectural requirements.

Although the Java programming language is often used to develop enterprise applications, Java environments do not currently offer common, easy-to-use apparatus and methods for enabling such enterprise applications to support detached (i.e., disconnected) computing for mobile users. Currently, in order for a local instance of an enterprise application to be used in a disconnected session, non-trivial special code must be developed to write session information to disk and then synchronize with the enterprise application once the mobile unit is reconnected to the home office system. Such efforts are typically expensive, often unreliable, and usually involve unacceptably extensive support.

In view of the foregoing, there is a need for easy-to-use methods and apparatus for providing applications with the ability to support intermittent connectivity processing. This need and others are addressed by embodiments of the claimed invention, including but not limited to the embodiments expressly described below.

SUMMARY OF THE INVENTION

The present invention relates generally to the field of computer applications development, and in particular to methods and apparatus for providing applications with the ability to support intermittent connectivity processing. In accordance with one particular embodiment of the claimed invention, as disclosed herein, an application development tool is configured for providing intermittent connectivity support in an application that uses distributed objects. The application development tool includes an intermittent connectivity framework having program code for queuing method calls to a distributed object, as well as an intermittent connectivity component generator having program code for converting an existing interface for a distributed object into an intermittent connectivity component configured to forward method calls to the intermittent connectivity framework for queuing.

DETAILED DESCRIPTION

Mobile computing is an ever-growing phenomenon. As new technologies for middleware and distributed object models are released, it is desirable to consider the needs of mobile customers, especially with respect to the development of enterprise applications. Unfortunately, at least in the near term, most mobile computer users have no readily-available way to use enterprise applications in an untethered (i.e., detached or disconnected) fashion. One purpose for supporting intermittent connectivity is therefore to facilitate the use of enterprise applications by mobile users. On the other hand, although the embodiments described below are generally directed to such uses, facilitating the connection of mobile clients to home office systems is only one example of where intermittent connectivity processing can be advantageously applied.

As noted in the background discussion above, in order to enable an application running on a mobile computer to participate in a detached session using current technology, it is generally necessary to develop non-trivial special code to write session information to the mobile computer's disk and then synchronize with the enterprise application once the mobile computer is reconnected to the home office. In effect, the application developer wishing to provide support for enterprise services is forced to either use a proprietary solution or effectively "reinvent the wheel" by, for example, developing his or her own mobile support software from scratch instead of using a COTS (commercial off-the-shelf) middleware solution. Such custom-built or proprietary solutions can be prohibitively expensive, thus limiting the development of "mobile-aware" enterprise applications (and consequently slowing the growth of the mobile computing market). Conversely, the use of standard APIs (Application Program Interfaces) usually mean conforming to the least common denominator (LCD) of functionality.

Given this state of affairs, it will be appreciated from the following discussion that embodiments of the invention described and claimed herein can be advantageously applied to furnish enterprise application developers with a tool for adding mobile-aware features to their applications. For example, in accordance with particular embodiments directed generally to applications that use the JavaBeans component architecture to access distributed objects, a common, easy-to-use, wizard-driven approach for adding intermittent connectivity support to existing and/or newly-developed applications is provided. This particular embodiment, designated ICBeans (i.e., Intermittent Connectivity (IC) Beans), provides a means to connect to virtually any distributed object model, including CORBA (Common Object Request Broker Architecture, developed by OMG), RMI (Remote Method Invocation, developed by Sun Microsystems, Inc.), DCOM (Distributed Component Object Model, distributed by MSFT), and EJB (Enterprise Java Beans, developed by Sun Microsystems, Inc.), thereby providing intermittent connectivity support for mobile computing without significant additional coding effort by enterprise application developers.

In general, the ICBeans approach can be used to give mobile users the ability to exploit enterprise applications while the mobile computer is disconnected from the home office system. For example, a mobile computer can be configured with a local instance of an enterprise application, as well as a local copy of enterprise data that the user would most often be expected to need. As the disconnected user makes changes and/or requests to the enterprise data, the changes and/or requests are temporarily stored on the mobile computer. After connectivity to the enterprise application is reestablished, the stored changes and/or requests are processed to synchronize the mobile computer with the enterprise application.

Figure 1:
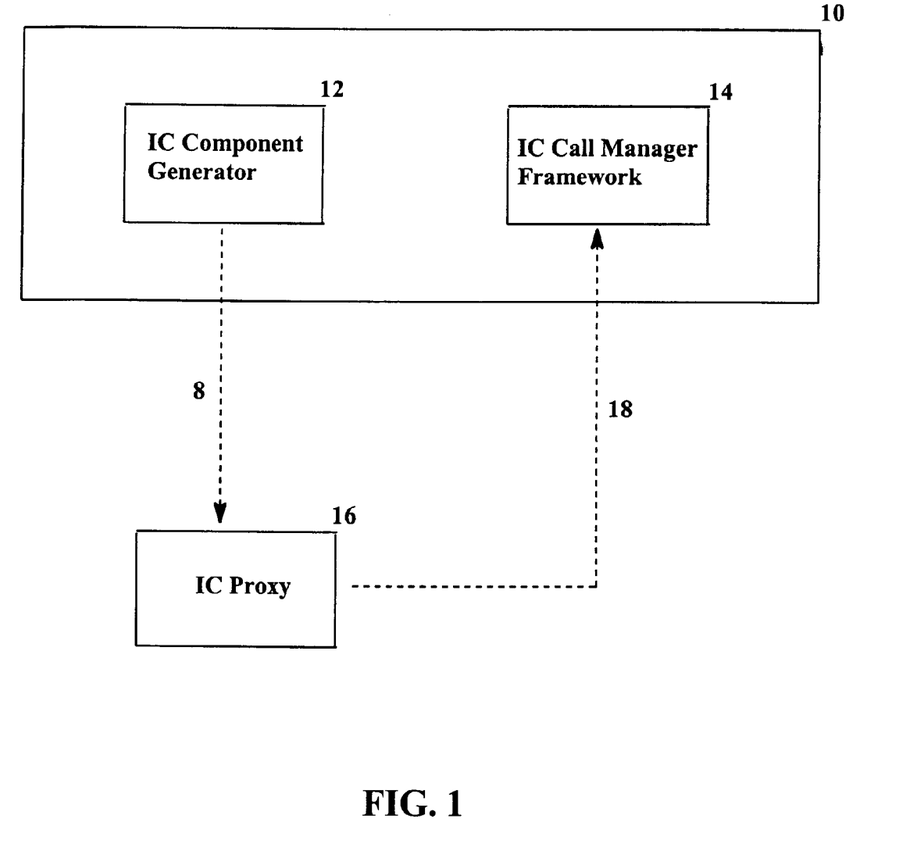
FIG. 1 is a block diagram illustrating an application development tool for providing intermittent connectivity support in accordance with an embodiment of the present invention.

In accordance with a first embodiment of the present invention, illustrated in FIG. 1, an application development tool 10 is provided to enable applications that access distributed objects to operate on an intermittent connectivity basis. This embodiment gives application developers a common, easy-to-use approach to adapting newly-developed or existing components included in enterprise applications for disconnected use. As used herein, and as is generally recognized in the art, a "component" is an executable module designed to access objects using method calls, where such objects may or may not be distributed (e.g., remote). Persons skilled in the art will appreciate from the following description that application development tool 10 can be configured to provide a means to connect to virtually any distributed objected model, providing intermittent connectivity support for mobile computing without significant additional coding effort by the enterprise application developer.

As shown in FIG. 1, application development tool 10 includes an IC (intermittent connectivity) component generator 12 and an IC call manager framework 14. IC component generator 12 contains program code for guiding an application developer through the process of creating an IC proxy 16 (indicated by the dotted arrow 8 running from IC component generator 12 to IC proxy 16). As is explained further below, when used in conjunction with IC call manager framework 14 (indicated by the dotted arrow 18 running from IC proxy 16 to IC call manager framework 14), IC proxy 16 provides intermittent connectivity support for a local instance of an application that requires access to, for example, enterprise application data resident on a remote computer (e.g., a home office system). Thus, in general, IC component generator 12 creates IC proxy 16, which in turn uses IC call manager framework 14.

In implementing the particular embodiment shown in FIG. 1, application development tool 10 may comprise software that can be installed on, for example, an application developer's personal computer (PC). Of course, persons skilled in the art will readily recognize that application development tool 10 could alternatively be implemented as a set of executable instructions stored on any computer-readable storage medium, including but not limited to a CD-ROM, a diskette, the hard disk of a computer, a memory of a remote application server, and so on. Likewise, although IC component generator 12 and IC call manager framework 14 are depicted as part of a single application development tool 10, they could of course be distributed and/or stored separately.

Figure 2:
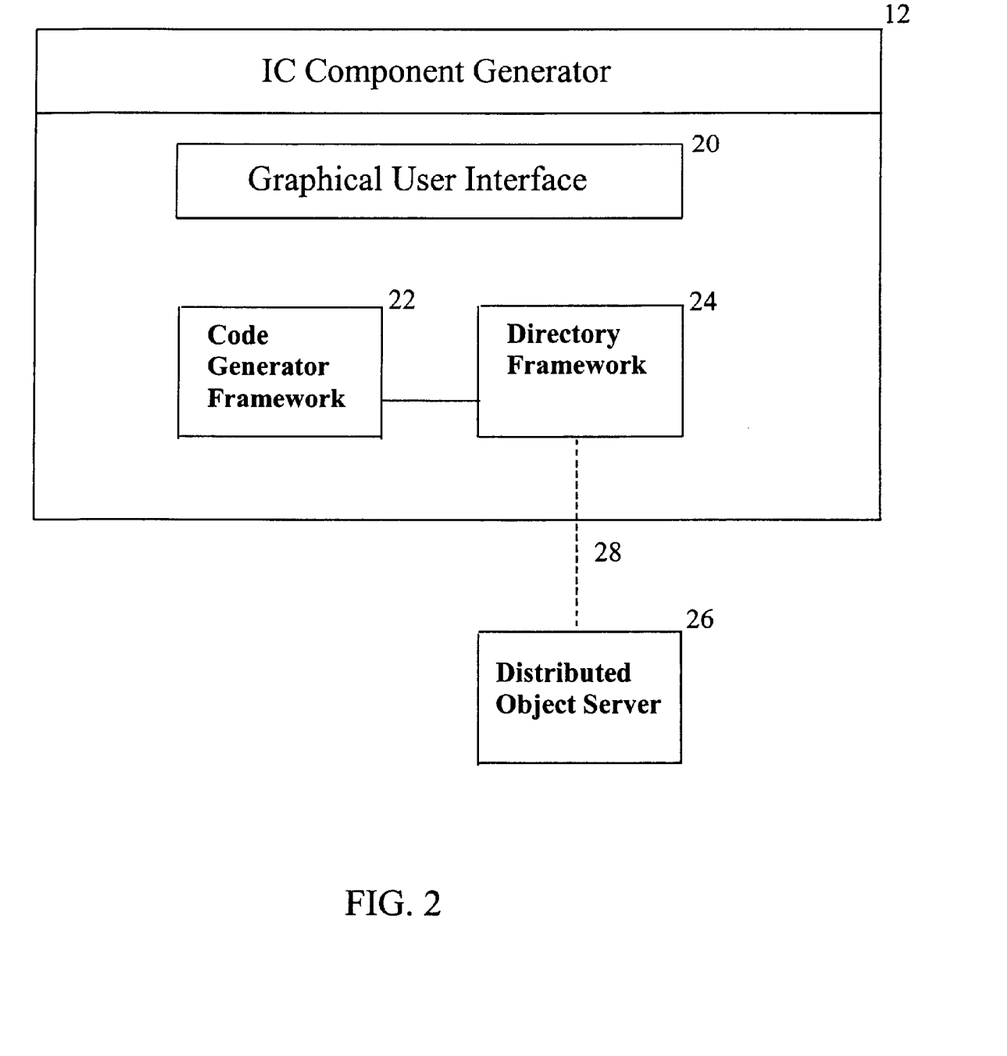
FIG. 2 is a block diagram illustrating a particular implementation of an intermittent connectivity component generator in accordance with the embodiment shown in FIG. 1.

FIG. 2 describes a particular implementation of IC component generator 12 in accordance with the embodiment illustrated in FIG. 1. In this implementation, IC component generator 12 includes a graphical user interface (GUI) 20, a code generator framework 22, and a directory framework 24. IC component generator 12 resides on a computer separate from, but in communication with, a distributed object server 26 (shown by the dotted line 28). However, other embodiments could readily be implemented in which distributed object server 26 and IC component generator 12 reside on the same computer.

IC component generator 12 of FIG. 2 can be implemented, for example, in the form of a wizard utility, as has become common for guiding users through software and hardware installations in Windows-based PC systems. In such an implementation, GUI 20 guides a user through the process of creating IC proxy 16, prompting the user via text, graphics, and/or audio, and obtaining any necessary user input through, for example, text input, push buttons, and the like. The implementation of such wizard utilities is well-known in the art, and thus is not described in detail herein.

Still referring to the particular implementation shown in FIG. 2, IC code generator framework 22 contains executable instructions for generating IC proxy 16 (see FIG. 1). To maximize flexibility and portability to different environments, IC code generator framework 22 may include a plurality of customized code generator modules (not shown), each of which is configured to generate an IC proxy 16 compliant with a particular distributed object model. For example, separate code generator modules can be provided for each of the RMI, EJB, CORBA, and DCOM distributed object models (to name some of the more common models), with the particular code generator module actually used being based upon input provided by the user through GUI 20. To further promote flexibility, IC code generator framework 22 can be configured to receive code generator modules in the form of plug-ins, thus enabling IC code generator framework 22 to readily support both current and future distributed object models without extensive modification. Again, plug-in architecture is well known in the art, and is therefore not described in detail herein.

Still referring to FIG. 2, directory framework 24 of IC component generator 12 includes executable instructions for looking up distributed objects in a distributed object naming directory service (DONDS) resident on distributed object server 26. A number of such services are currently available, including the RMI Registry, COSNaming, the Windows Registry, and JNDLDAP. A DONDS may be built for each such directory or naming service. The requirements and techniques for interfacing with these services are well known in the art, and thus are not described in detail herein.

To further illustrate the operation of IC component generator 12 in accordance with the particular embodiment shown in FIG. 2, the following pseudocode corresponds to one possible implementation of that embodiment:

```
AttachToRemoteServer( );
ShowListOfRemoteServices( );
    User selects a remote service
    // Use Java Reflection, CORBA Interface Repository,
    // DCOM TypeLib, etc.
ReadMetaDataFromRemoteService( );
CreateWrapperClassForICBeans( );
```

It should be noted that the foregoing pseudocode is presented by way of example only. As with almost any programming task, there are many equally-acceptable ways to code IC component generator 12.

Figure 3:
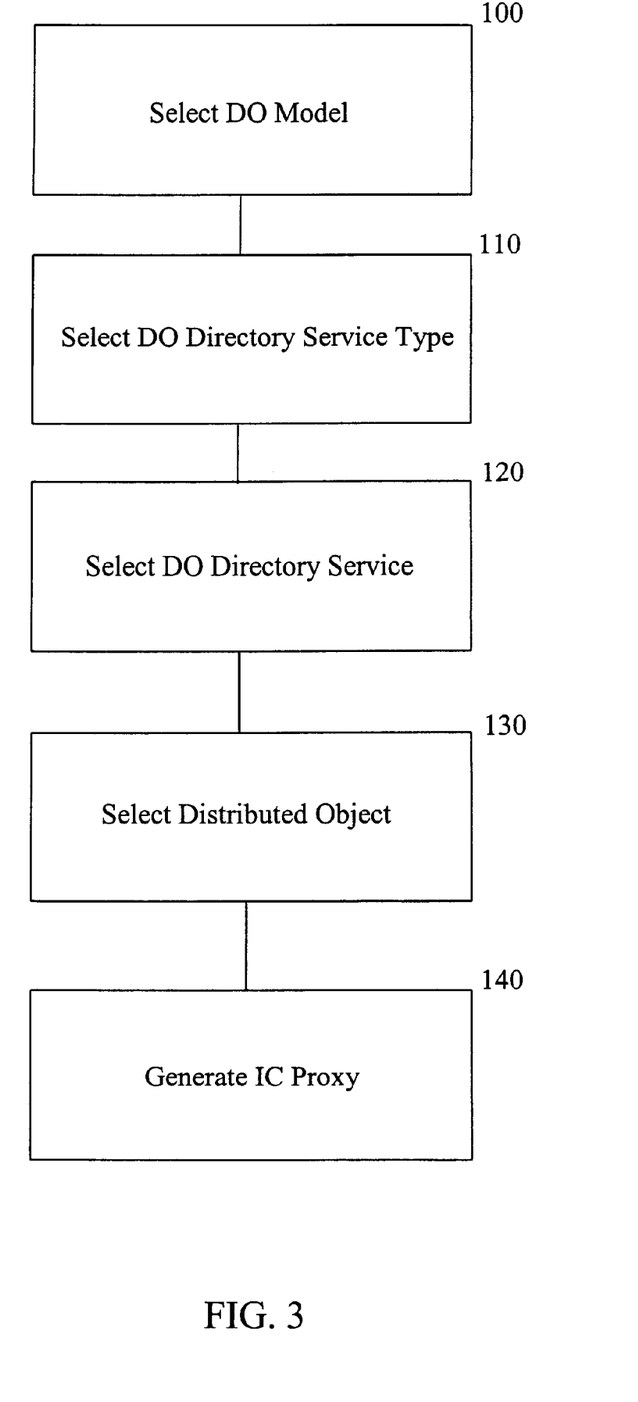
FIG. 3 is a flow chart illustrating the functionality of the particular implementation of an intermittent connectivity component generator shown in FIG. 2.

By way of further illustration, FIG. 3 is a flow chart showing an example of the interaction between a user and IC component generator 12 in accordance with the particular implementation shown in FIG. 2. In this example, GUI 20 first prompts the user to select a distributed object (DO) model (e.g., RMI, EJB, CORBA, or DCOM) (Step 100). This may be done, for example, by using a mouse to "click" on one of a plurality of distributed object models displayed in list form.

Once the distributed object model is selected, the user is similarly prompted to select a DO directory service type (e.g., COSNaming, RMIRegistry, ActiveDirectory) (Step 110). Ideally, GUI 20 is configured to only present the user with the option of selecting DO directory service types that are valid for the previously-selected DO model. The user is then prompted to select a DO directory service by, for example, supplying the location of a directory to be used (Step 120). This selection may be as simple as prompting the user to select or otherwise input a URL (Uniform Resource Locator) for a desired directory service or, alternatively, may comprise a more sophisticated "find" feature. With reference to FIG. 2, this particular selection corresponds to identifying distributed object server 26.

After the location of the directory service is supplied, the user is prompted to select a distributed object for which intermittent connectivity support is to be provided (Step 130). As with the other selections described above, GUI 20 may be configured to present the user with a list of distributed objects known to be accessible through the selected directory service. Alternatively, after the user supplies the location of the desired directory service, IC component generator 12 can be configured such that directory framework 24 establishes a communications link with distributed object server 26, dynamically determines the distributed objects available from the selected directory service, and presents a list of those distributed objects to the user for selection. Once the user has selected a distributed object, IC component generator 12 has all the information it needs to generate IC proxy 16.

The example illustrated in FIG. 3 assumes a relatively-robust implementation of IC component generator 12, capable of supporting, for example, a variety of different distributed object models and/or directory service types. Of course, it is possible to configure IC component generator 12 such that the user has fewer (or even no) options, thereby reducing the extent of the user interaction.

In accordance with another particular implementation of the embodiment shown in FIG. 1, IC proxy 16 is configured for use in providing intermittent connectivity support for applications that use components compliant with the Java-Beans component architecture to access distributed objects using the Java Remote Method Invocation (RMI) protocol. The JavaBeans component architecture, including the Java-Beans API (Application Programmer Interface) specification, is detailed in various documents published by Sun Microsystems, Inc. (available through http://java.sun.com as of February 1999). Likewise, the Java RMI protocol is described in "Java Remote Method Invocation—Distributed Computing for Java" (available at http://www.javasoft.com/marketing/collateral/javarmi.html as of February 1999). In such an implementation, an enterprise application that was not originally designed to support intermittent connectivity operation will typically include a proxy stub (downloaded, for example, from RMI) to which the application directs method calls for a particular distributed object. The proxy stub translates those method calls into remote calls to a distributed object server on which the desired object resides, and returns either the requested object or an appropriate error indication to the calling application.

Figure 4:
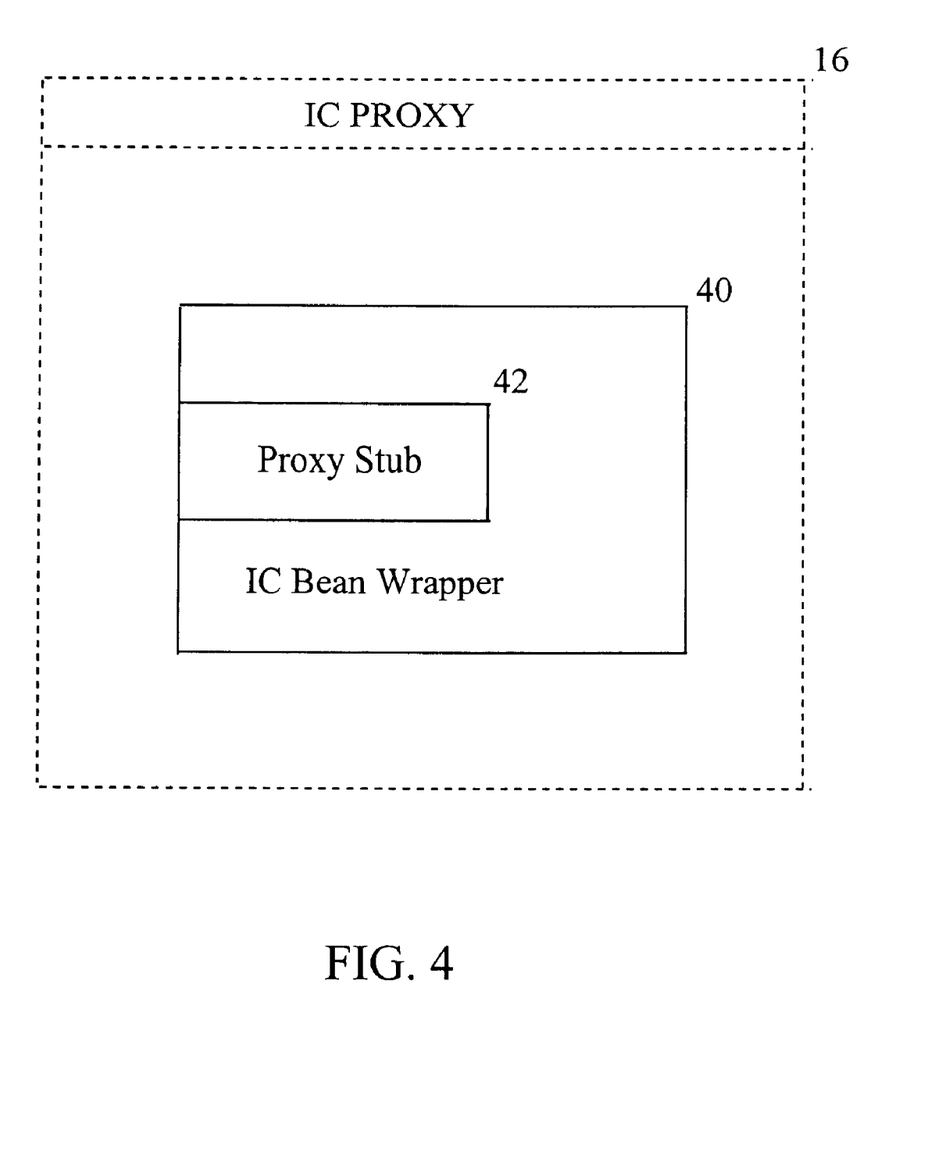
FIG. 4 is a block diagram illustrating an implementation of an intermittent connectivity proxy in accordance with the embodiment shown in FIG. 1.

Referring now to FIG. 4, in an embodiment directed to an environment such as that just described, IC proxy 16 comprises an IC bean wrapper 40 wrapped around a proxy stub 42. As is well known in the art, the term "bean" generally refers to a local component, while the term "bean wrapper" generally refers to a wrapper around an existing proxy stub.

Proxy stub 42 is a standard proxy stub for accessing a particular distributed object, and is used for communicating with the distributed object server on which that distributed object resides. IC bean wrapper 40 comprises a Java bean that IC component generator 12 (see FIG. 1) creates and wraps around proxy stub 42. Techniques for the creation of such bean wrappers are well known in the art, and thus are not described in detail herein.

IC bean wrapper 40 is configured such that application calls to proxy stub 42 can be monitored by IC bean wrapper 40, thereby enabling IC bean wrapper 40 to perform intermittent connectivity processing on an as-needed basis. In a particular implementation, for example, IC bean wrapper 40 includes code for catching a remote exception thrown by proxy stub 42 and, in response, handling the exception by storing the method call in an outgoing queue (not shown). IC bean wrapper 40 can also set a "not connected" flag. IC bean wrapper 40 then works in conjunction with IC call manager framework 14 to regain connection to the distributed object server. When the connection is regained, the method calls stored in the outgoing queue are sent to the distributed object server. When all of the queued method calls have been successfully sent, IC bean wrapper 40 resets the "not connected" flag. Thus, as long as the "not connected" flag is set, all method calls are sent directly to the outgoing queue; when the connection is reestablished and the outgoing queue is empty, the "not connected" flag is reset and method calls are sent directly to the distributed object server.

As noted above with reference to FIG. 2, code generator framework 22 of IC component generator 12 can be configured to support a variety of different distributed object models (e.g., by providing customized code generator plug-ins), such that IC bean wrapper 40 is tailored to the requirements of the particular distributed object model associated with proxy stub 42. For example, where proxy stub 42 is an RMI stub (e.g., RMI_CG), code generator framework 22 can use the Java Reflection API and information in the RMI stub to generate the code for IC bean wrapper 40. A similar approach can be used to generate the code for IC bean wrapper 40 where proxy stub 42 is an EJB stub (e.g., EJB_CG, WEJB_CG, EEJB_CG), a CORBA Java stub (e.g., CORBA_CG_WS), or a DCOM Java proxy object (e.g., DCOM_CG_WS). Alternatively, it is possible to generate IC bean wrapper 40 using metadata collected from existing type libraries (e.g., IDispatch, TypeLibraries, Dispinterface) or interface repositories (e.g., the CORBA Interface repository), as is known in the art. It should be noted that proxy stub 42 need not reside on the same computer as IC component generator 12, although in some instances (e.g., a CORBA Java stub) this may make implementation easier by, for example, facilitating the availability of richer metadata and the use of the Java Reflection API.

In accordance with particular embodiments of the present invention, at least two different types of intermittent connectivity processing can be supported, for example, using application development tool 10 of FIG. 1. Facilities for supporting a first type of intermittent connectivity processing, designated "through-the-transport" or "TTT" intermittent connectivity, are illustrated generally in FIG. 5; whereas facilities for supporting a second type of intermittent connectivity processing, designated "around-the-transport " or "ATT" intermittent connectivity, are illustrated generally in FIG. 6. In this context, the term "transport" refers to a distributed object model transport, such as DCOM, CORBA, or RMI (as opposed to, for example, the transport layer of the OSI seven-layer architecture). While the embodiments of FIG. 5 and FIG. 6 depict separate facilities for supporting TTT and ATT intermittent connectivity respectively, a single facility could readily be configured to support both types of intermittent connectivity.

Figure 5:
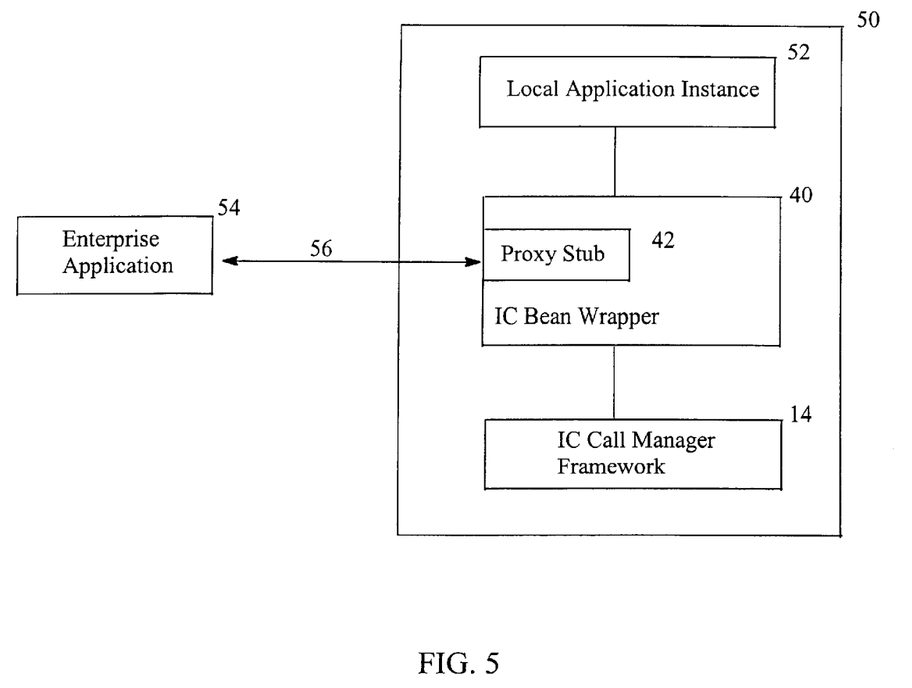
FIG. 5 is a block diagram illustrating a system for supporting through-the-transport intermittent connectivity processing in accordance with an embodiment of the present invention.
Figure 6:
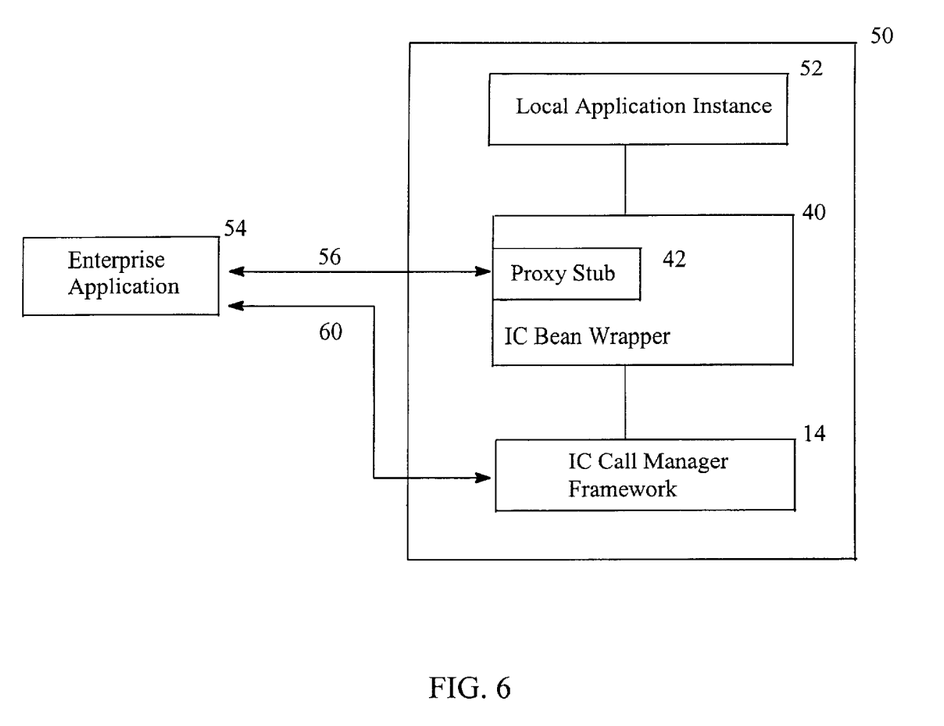
FIG. 6 is a block diagram illustrating a system for supporting around-the-transport intermittent connectivity processing in accordance with another embodiment of the present invention.

Referring now to FIG. 5, a client computer 50, such as a laptop PC, has installed thereon a local application instance 52 of an enterprise application 54. Local application instance 52 includes proxy stub 42 and IC bean wrapper 40 (see, for example, discussion above with respect to FIG. 4), and proxy stub 42 is configured to communicate with enterprise application 54 through transport 56. Here, enterprise application 54 is resident on a server computer (e.g., a corporate applications server), and transport 56 comprises the means by which proxy stub 42 would ordinarily retrieve (or send) distributed objects from (or to) enterprise application 54. In other words, transport 56 encompasses the communications protocols and interfaces defined for the particular distributed object model being used. Client computer 50 also includes IC call manager framework 14 (see, for example, discussion above with respect to FIG. 1) in communication with IC bean wrapper 40.

Under normal (i.e., connected) operating conditions, such as when client computer 50 is connected to a LAN docking station that enables communication with enterprise application 54, a method call for a particular distributed object would generally be directed by local application instance 52 to proxy stub 42, which would in turn forward the method call to enterprise application 54 through transport 56. Enterprise application 54 would then attempt to retrieve the requested distributed object from, for example, a distributed object server (not shown), and then would return the retrieved distributed object to proxy stub 42 through transport 56. In this embodiment, IC bean wrapper 40 provides intermittent connectivity support for those occasions when proxy stub 42 is unable to communicate with enterprise application 54, such as when client computer 50 is not connected to the system on which enterprise application 54 is running.

Still referring to FIG. 5, IC bean wrapper 40 includes instructions for monitoring the activities of proxy stub 42. Upon detecting from proxy stub 42 that method calls for distributed objects cannot be made (e.g., client computer 50 is disconnected), IC bean wrapper 40 forwards the unsatisfied method calls to IC call manager framework 14. IC call manager framework 14 then queues the unsatisfied calls until connectivity with enterprise application 54 is restored. Calls may be queued, for example, in a data store (not shown) resident in a memory of client computer 50 to which IC bean wrapper 40 has read/write access. Once IC bean wrapper 40 detects a connection between client computer 50 and enterprise application 54, IC call manager 14 processes the queued calls through transport 56 to synchronize local application instance 52 with enterprise application 54 (using, for example, techniques described above). The present embodiment thus permits the user of client computer 50 to continue using local application instance 52 even in the absence of a connection to enterprise application 54.

To further illustrate the operation of IC bean wrapper 40 in accordance with the particular embodiment shown in FIG. 5, the following pseudocode corresponds to one possible implementation of that embodiment:

```
package com.intel.deal
    // Original Inventory Remote interface
    public interface Inventory extends java.rmi.Remote {
        public void place(java.lang.String itme, int qty) throws
        java.rmi.RemoteException;
        . . .
        . . .
    }
    // This class was autogenerated on Fri Jan 08 16:01:30
    // MST 1999.
    // This class was created with the DEAL intermittent
    // connectivity bean wizard.
    import com.intel.deal.icbean.*;
    import java.rmi.*;
    import java.lang.reflect.*;
        // The Inventory IC Bean implements the original
            Inventory interface public class InventoryICBean
```

```
    implements com.intel.deal.Inventory,
        com.intel.deal.icbean.ICBean, java.io.Serializable
{
    com.intel.deal.Inventory inventory;
    com.intel.deal.icbean.Log log;
    String servername="rmi://
azdeals99/RMI_InventoryServer";
    ICCallManager callmanager;
    voice save(Method m, java.io.Serializable [ ]
        arguments)
    {callmanager.storeMethod(m, this, arguments);}
    boolean connected=false;
    public void setConnected( ) {connected=true;}
    public InventoryICBean ( ) {
    . . .
    connect ( );
    }
. . .
. . .
. . .
    public void place (java.lang.String param0, inte
        param1) throws java.rmi.RemoteException {
        try {
            //check to see if it is connected to the
            //RMI server.
            if ( ( connected==true) && (inventory!=null))
                inventory.place (param0, param1);
            else throw new java.rmi.RemoteException ( );
        } // end of try
        catch (java.rmi.RemoteException re) {
            // Create an array of classes corresponding to
            // the types of the parameters
            // passed to this method.
            Class [ ] parameters=new Class[2];
            // Create an array of Serializable Objects to //
                hold the parameters passed to this method
                :java.io.Serializable [ ] arguments=new :java.i-
                o.Serializable [2];
            // Fill in the objects and class types for the //
                parameters.
            parameters[0]=java.lang.String.class;
            arguments[0]=param0;
            parameters[1]=int.class;
            arguments[1]=new Integer (param1);
            Method m;
            try {
                // Load the class.
                Class _class=Class.forName
                ("com.intel.deal.Inventoryl");
                // Get the method.
                m=_class.getDeclareMethod ("place",
                    parameters);
                // Save it for later retrieval when the connection
                    comes up.
                save (m, arguments);
            }
            catch (NoSuchMethodException nsme) {
            . . .
            } // end of catch Exception
        } // end of catch RemoteException
    } // end of place definition
. . .
. . .
} // end of class definition
```

It should be noted that the foregoing pseudocode is presented by way of example only. As with almost any programming task, there are many equally-acceptable ways to code IC bean wrapper 40.

IC call manager framework 14 can apply any of a number of commercially-available persistent store component (PSC) utilities for supporting TTT intermittent connectivity processing by, for example, incorporating a component to take advantage of such a PSC. Among these utilities are the Lotus Notes Store PSC, Cloudscape PSC, and Intel PS packages. Alternatively, IC call manager framework 14 can include customized PSC code. Where IC call manager framework 14 includes a plurality of PSC options, code may be included for automatically selecting an option based upon, for example, characteristics of the method call to be queued or characteristics of the transport being used. In essence, in embodiments such as that shown in FIG. 5, IC call manager framework 14 serves as a component model for plugging in intermittent connectivity support systems including lightweight databases, groupware products, and the aforementioned message queuing products.

Through-the-transport intermittent connectivity offers a number of advantages. For example, no additional server-side support is required to support mobile clients. Rather, the same distributed enterprise applications that are designed principally to satisfy the needs of desktop (i.e., connected) users will work equally well for mobile users. Likewise, most standard distributed object protocols provide some means for getting through firewalls, thus facilitating the ability of a mobile client to synchronize with a home office enterprise application by communicating over the Internet. TTT intermittent connectivity thus avoids the problems that arise when the particular messaging service in use does not provide a means for getting through a firewall, preventing the user from communicating with the home office system until the mobile client is reconnected.

As noted above, in addition to TTT intermittent connectivity, embodiments of the present invention can be configured to support around-the-transport (ATT) intermittent connectivity processing. One such embodiment is illustrated in FIG. 6, which shows an arrangement that is structurally similar to that described above with respect to the embodiment of FIG. 5, with the exception of a synch communications path 60 running between IC call manager framework 14 and enterprise application 54. As with the through-the-transport embodiment, when client computer 50 is connected to enterprise application 54, method calls initiated from local application instance 52 are routed to enterprise application 54 through transport 56. Also like the foregoing embodiment, when client computer 50 is not connected to enterprise application 54, method calls are queued by IC call manager framework 14. However, unlike the TTT embodiment, in order to synchronize with enterprise application 54 following a disconnect, IC call manager framework 14 processes queued method calls over synch communications path 60 (i.e., "around" transport 56). To this end, IC call manager framework 14 may incorporate any of a number of different commercially-available synchronization tools, such as the MSQueue, Lotus Notes, MQSeries, and Outlook packages, by, for example, including a component corresponding to each such supported tool.

ATT intermittent connectivity provides certain advantages over TTT, including, for example, the lack of any requirement that an application be running in order to receive messages, and the provision of a central store of messages for a given enterprise application. On the other hand, implementation of ATT intermittent connectivity may sometimes be undesirable because it generally requires modification of the server-side enterprise application to support synchronization processing through a separate communications interface.

Benefits provided by embodiments such as those described above include supporting mobile computer users by lowering the cost of developing mobile-aware applications, hopefully making such applications more available and more affordable. Also, when implemented with a wizard-driven model and a plug-in compatible framework, such embodiments allow developers to add intermittent connectivity functionality that exceeds any set LCD value imposed by a rigid API without additional complexity imposed on end-users (e.g., the enterprise application developer), and without tying the developer to any particular product. Conversely, embodiments of the present invention allow developers to choose the product that provides the best level of support with an upward path to take advantage of future features and function points without excessive additional effort.

Persons skilled in the art will recognize from the foregoing discussion that intermittent connectivity support can be beneficially applied in many different situations where an application needs a reliable connection to a remote computer. For example, in addition to the uses referenced above, intermittent connectivity processing can be implemented to support mission-critical connections. For such connections, where unreliability may be defined by as little as 5 minutes of communications down-time per year, intermittent connectivity can provide valuable protection against negative effects of communications disruptions. Likewise, applications requiring connections of relatively long duration can benefit from intermittent connectivity support because longer connections often suffer from decreased reliability. Connections that typically have a relatively high percentage of inactive time are also good candidates for intermittent connectivity processing. For applications using such connections, intermittent connectivity allows the application to function as though it was constantly connected to a remote computer, but without incurring the cost of such constant connection. Still further, there are many instances where a substantial amount of work can be performed on a mobile client without being connected to an enterprise application.

Intermittent connectivity is also useful beyond a particular entity's Intranet. For example, intermittent connectivity technology can be used to support connecting Internet customers to a business' enterprise applications (e.g., an order processing system), permitting customers to use such applications in a disconnected manner and then synchronize with the enterprise application when the customer reconnects to the Web.

Intermittent connectivity technology can also be beneficially applied on the Internet for Business-to-Business (i.e., B2B) communication. Since telecommunications connections can go down and Internet connections can get flooded with activity, the added reliability offered by intermittent connectivity can be highly beneficial. By way of illustration, consider the following hypothetical companies. Company A is a manufacturer who has implemented a just-in-time (JIT) inventory system. When Company A receives orders for its products, it automatically orders the necessary parts from its supplier, Company B, via a B2B Internet connection. Since Company A does not have to maintain a large inventory of Company B's parts, Company A saves money. However, if there is a lot of traffic on Company A's network, or the telecommunications connection between Company A and Company B goes down, Company A's manufacturing operations could be slowed or even halted as a result of a parts shortage. Intermittent connectivity support between Company A and Company B can help avoid such a situation, providing greater guarantees that Company A's parts orders will be received by Company B in a timely manner.

The foregoing provides a detailed description of particular embodiments of the claimed invention; however, the claimed invention also embraces all alternatives, modifications and variations that fall within the letter and spirit of the appended claims, as well as all equivalents of the claimed subject matter. For example, consistent with the teachings set forth above, embodiments of the present invention may be used to provide intermittent connectivity support in other than Java environments. Likewise, the intermittent connectivity approaches described herein are not limited solely to use with applications that use distributed objects. Still further, although the foregoing description was directed largely to embodiments involving client-to-server communications using, for example, mobile PCs, persons skilled in the art will recognize that those and other embodiments can be readily applied to any of the following configurations: server-to-client communications, server-to-server communications, and client-to-client (i.e., peer-to-peer) communications. The scope of the present invention is thus not limited to any particular computer-to-computer configuration. Persons skilled in the art will recognize from the foregoing detailed description that many other alternatives, modifications and variations are also possible.

What is claimed:

1. An application development tool for providing intermittent connectivity support for an application that uses distributed objects, said application development tool comprising:

an intermittent connectivity framework including program code for queuing method calls; and an intermittent connectivity component generator including program code for converting an existing interface for the distributed object into an intermittent connectivity component configured to forward method calls to the intermittent connectivity framework for queuing, wherein, when the application is connected to a local instance of the application, the application is connected to the local instance via a first transport and a second transport, the intermittent connectivity framework synchronizing the local instance with the application via the first transport and simultaneously forwarding the queued method calls to the application via the second transport.

2. The application development tool of claim 1, wherein said intermittent connectivity component is configured to forward method calls to the intermittent connectivity framework while there is no connection to the distributed object.

3. The application development tool of claim 2, wherein said intermittent connectivity framework is configured to complete queued method calls after connection to the distributed object is established.

4. The application development tool of claim 3, wherein the existing interface for a distributed object comprises a transport for the distributed object, said intermittent connectivity framework being further configured to complete said queued method calls using the transport for the distributed object.

5. The application development tool of claim 3, wherein the existing interface for a distributed object comprises a transport for the distributed object, said intermittent connectivity framework being further configured to complete said queued method calls without using the transport for the distributed object.

6. The application development tool of claim 1, wherein said intermittent connectivity component generator comprises a graphical user interface.

7. The application development tool of claim 1, wherein said intermittent connectivity component generator comprises a directory framework.

8. The application development tool of claim 7, wherein said directory framework is configured to communicate with a distributed object server.

9. The application development tool of claim 1, wherein said intermittent connectivity component generator comprises a code generator framework.

10. The application development tool of claim 9, wherein said code generator framework comprises a plurality of code generator modules respectively corresponding to a plurality of distributed object models.

11. The application development tool of claim 1, wherein each of said code generator modules comprises a plug-in application program interface.

12. The application development tool of claim 1, wherein the existing interface comprises a proxy stub for accessing a distributed object in accordance with a Java-based component architecture, said intermittent connectivity component generator further including program code for wrapping a JavaBean wrapper around the proxy stub.

13. The application development tool of claim 1, wherein said intermittent connectivity component generator comprises a wizard utility.

14. A computer-implemented method for providing intermittent connectivity support in an application that uses distributed objects, said method comprising:
   generating method calls from a local instance of the application;
   selecting one of a plurality of distributed object models requested by the method calls;
   identifying a distributed object corresponding to the selected distributed object model for which intermittent connectivity support is to be provided;
   identifying a proxy stub for accessing said identified distributed object; and
   generating an intermittent connectivity proxy corresponding to the proxy stub, the intermittent connectivity proxy being configured to queue the method calls to the proxy stub while there is not a connection to the identified distributed object; and
   while there is the connection, synchronizing the local instance with the application via a first transport and simultaneously transporting the method calls to the identified distributed object via a second transport.

15. The computer-implemented method of claim 14, further comprising:
   selecting a distributed object directory service type corresponding to the selected distributed object model;
   selecting a distributed object directory service corresponding to the selected distributed object directory service type; and
   selecting the distributed object for which intermittent connectivity support is to be provided from a list of distributed objects accessible through the selected distributed object directory service.

16. The method of claim 14, further comprising configuring an intermittent connectivity call manager framework in communication with the intermittent connectivity proxy, wherein the intermittent connectivity proxy forwards method calls to be queued to the intermittent connectivity call manager framework.

17. A storage medium containing a set of instructions for execution by a computer, the set of instructions being configured to generate an intermittent connectivity component for accessing a distributed object, and including instructions for:
   generating method calls from a local instance of the application;
   selecting one of a plurality of distributed object models requested by the method calls;
   identifying a distributed object corresponding to the selected distributed object model for which intermittent connectivity support is to be provided;
   identifying a proxy stub for accessing said identified distributed object; and
   generating an intermittent connectivity proxy corresponding to the proxy stub, the intermittent connectivity proxy being configured to queue the method calls to the proxy stub while there is not a connection to the identified distributed object; and
   while there is the connection, synchronizing the local instance with the application via a first transport and simultaneously transporting the method calls to the identified distributed object via a second transport.

18. The storage medium of claim 17, wherein the set of instructions further comprises instructions for:
   selecting a distributed object directory service type corresponding to the selected distributed object model;
   selecting a distributed object directory service corresponding to the selected distributed object directory service type; and
   selecting the distributed object for which intermittent connectivity support is to be provided from a list of distributed objects accessible through the selected distributed object directory service.

19. The storage medium of claim 17, wherein said storage medium comprises a portable storage device.

20. The storage medium of claim 17, wherein said storage medium comprises a memory of a computer.

21. An application development tool for providing intermittent connectivity support for an application that uses distributed objects, said application development tool comprising:
   a local instance of the application configured to generate method calls to the application for a distributed object;
   an intermittent connectivity framework including program code for queuing the method calls while there is not a connection to the application and for synchronizing the local instance with the application via a first transport while there is the connection; and
   an intermittent connectivity component generator including program code for converting an existing interface for the distributed object into an intermittent connectivity component configured to forward method calls to the intermittent connectivity framework for queuing while there is not the connection and forwarding method calls to the application via a second transport while there is the connection,
   the first and second transports in use simultaneously.

22. The application development tool of claim 9, wherein said code generator framework comprises a plurality of code generator modules respectively corresponding to a plurality of distributed object models.

* * * * *